United States Patent
Arulandu et al.

(10) Patent No.: US 10,734,920 B2
(45) Date of Patent: Aug. 4, 2020

(54) ELECTRICAL CURRENT WAVEFORM GENERATOR, ACTUATOR AND GENERATION METHOD

(71) Applicant: KONINKLIJKE PHILIPS N.V., Eindhoven (NL)

(72) Inventors: Kumar Arulandu, Eindhoven (NL); Michiel Van Lierop, Eindhoven (NL); Lutz Christian Gerhardt, Eindhoven (NL); Mark Thomas Johnson, Eindhoven (NL); Hans Kroes, Eindhoven (NL); Neil Francis Joye, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 38 days.

(21) Appl. No.: 15/756,601

(22) PCT Filed: Aug. 31, 2016

(86) PCT No.: PCT/EP2016/070494
§ 371 (c)(1),
(2) Date: Mar. 1, 2018

(87) PCT Pub. No.: WO2017/037104
PCT Pub. Date: Mar. 9, 2017

(65) Prior Publication Data
US 2018/0191274 A1 Jul. 5, 2018

(30) Foreign Application Priority Data

Sep. 4, 2015 (EP) .................................... 15183799

(51) Int. Cl.
*H02N 1/04* (2006.01)

(52) U.S. Cl.
CPC .................................... *H02N 1/04* (2013.01)

(58) Field of Classification Search
CPC ....................................................... H02N 1/04
(Continued)

(56) References Cited

U.S. PATENT DOCUMENTS 6,124,649 A 9/2000 Schafroth
6,710,598 B2 * 3/2004 Leussler ............ G01R 33/3678
324/318

(Continued)

FOREIGN PATENT DOCUMENTS

| CN | 103780129 A | 5/2014 |
|----|-------------|--------|
| GB | 2437116 A | 10/2007 |
| JP | 103825489 A | 5/2014 |

OTHER PUBLICATIONS

Wang et al "Triboelectric Nanogenerators of Self-Powered Active Sensors" Nano Energy 11 (2015) p. 436-462.

(Continued)

*Primary Examiner* — John K Kim

(57) ABSTRACT

The invention provides a device for generating electrical currents of a particular desired waveform through the combining of a plurality of different frequency output currents generated by plurality of power generating arrangements. The power generating arrangements each comprise at least first and second sets of generating elements, configured to hold a relative charge and to be moveable with respect to one another in order to generate an electrical output current of a particular frequency.

15 Claims, 8 Drawing Sheets

(58) Field of Classification Search
USPC .......................................................... 310/310
See application file for complete search history.

(56) References Cited

U.S. PATENT DOCUMENTS

| | | | | |
|---|---|---|---|---|
| 9,484,842 | B2* | 11/2016 | Wang | H02N 1/04 |
| 10,222,761 | B2* | 3/2019 | Ihara | H02N 1/08 |
| 2004/0016120 | A1* | 1/2004 | Boland | H02N 1/08 |
| | | | | 29/886 |
| 2008/0067982 | A1* | 3/2008 | Dooley | H02P 9/34 |
| | | | | 322/22 |
| 2009/0008936 | A1* | 1/2009 | Dooley | H02P 9/34 |
| | | | | 290/7 |
| 2010/0072959 | A1* | 3/2010 | Dooley | H02P 9/34 |
| | | | | 322/90 |
| 2012/0256422 | A1* | 10/2012 | Fradella | H02K 1/2793 |
| | | | | 290/55 |
| 2014/0084748 | A1 | 3/2014 | Wang et al. | |
| 2014/0246951 | A1 | 9/2014 | Wang et al. | |
| 2014/0247951 | A1 | 9/2014 | Wang et al. | |
| 2014/0292138 | A1 | 10/2014 | Wang et al. | |
| 2015/0236619 | A1 | 8/2015 | Hattori | |
| 2018/0191274 | A1* | 7/2018 | Arulandu | H02N 1/04 |

OTHER PUBLICATIONS

Wang "Triboelectric Nanogenerators as New Energy Technology for Self-Powered Systems and as Active Mechanical and Chemical Sensors" ACS Nano (2013) p. 9533-0557.

Bai et al "Integrated Multilayered Triboelectric Nanogenerator for Harvesting Biomechanical Energy From Human Motions" ACS Nano 2013 pp. 3713-3719.

Wang et al "Freestanding Triboelectric-Layer-Based Nanogenerators for Harvesting Energy From a Moving Object of Human Motion in Contact and . . . " Adv. Mater 2014 vol. 26, p. 2818-2824.

Ya et al "Single Electroe Based Sliding Triboelectric Nanogenerator for Self Powered Displacement Vector Sensor System" ACS Nano 7.8 (2013) p. 7342-7351.

Fan et al "Flexible Triboelectric Generator" Nano Energy (2012).

Han et al "High Power Triboelectric Nanogenerator Based on Printed Circuit Board (PCB) Technology" Nano Res, DOI 10. 1007 Jul. 15, 2014.

Y.S. Zhou et al Nanometer Resolution Self-Powered Static and Dynamic Motion Sensor Based on Micro-Grated Triboelectrification. Advanced Materials (vol. 26, issue 11, pp. 1719-1724) DOI:0.1002/adma.201304619.

X.S. Zhang et al. "High performance triboelectric nanogenerators based on large-scale mass-fabrication technologies" 2014.Nano Energy, vol. 11, Jan. 2015, pp. 304-322 DOI:10.1016/j.nanoen_2014.11.012.

Niu et al "Optimization of Triboelectric Nanogenerator Charging Systems for Efficient Energy Harvesting and Storage" IEEE Transactions on Electron Devices, vol. 62, No. 2, Feb. 2015 p. 641-647.

* cited by examiner

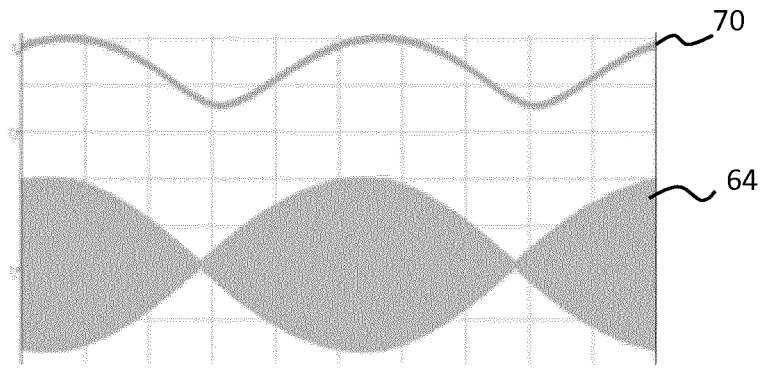
FIG. 5
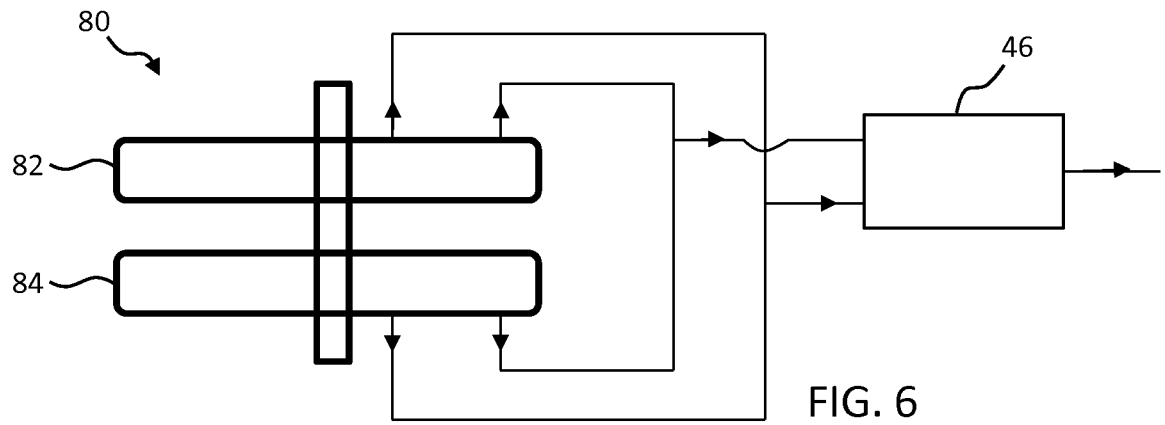
FIG. 6
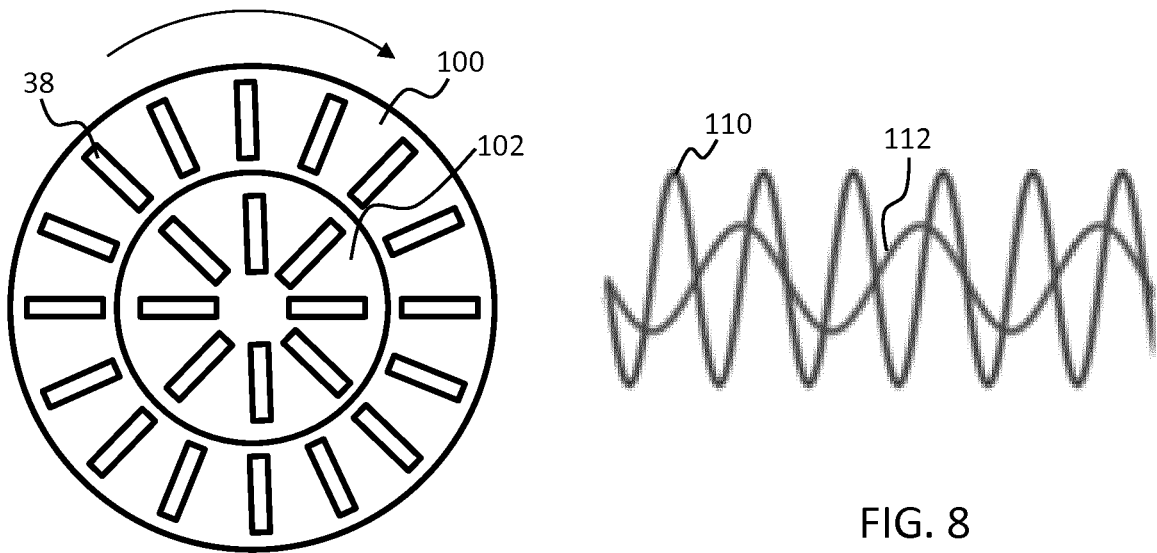
FIG. 7
FIG. 8

ELECTRICAL CURRENT WAVEFORM GENERATOR, ACTUATOR AND GENERATION METHOD

CROSS-REFERENCE TO PRIOR APPLICATIONS

This application is the U.S. National Phase application under 35 U.S.C. § 371 of International Application No. PCT/EP2016/070494, filed on Aug. 31, 2016, which claims the benefit of EP Patent Application No. EP 15183799.4, filed on Sep. 4, 2015. These applications are hereby incorporated by reference herein.

FIELD OF THE INVENTION

The invention relates to a device (and method) for generating electrical currents having a particular waveform, and in particular to a device for generating such currents by means of an energy generator adapted to convert mechanical energy into electrical energy.

BACKGROUND OF THE INVENTION

The harvesting or conversion of small-scale sources of mechanical energy into usable forms of electrical energy is an area which has attracted significant attention in recent years, and as a technology field has undergone rapid and substantial development.

One field in particular which has been the focus of much attention is that of triboelectric energy generation. The triboelectric effect (also known as triboelectric charging) is a contact-induced electrification in which a material becomes electrically charged after it is contacted with a different material through friction. Triboelectric generation is based on converting mechanical energy into electrical energy through methods which couple the triboelectric effect with electrostatic induction. It has been proposed to make use of triboelectric generation to power wearable devices such as sensors and smartphones by capturing the otherwise wasted mechanical energy from such sources as walking, random body motions, the wind blowing, vibration or ocean waves (see, for example: Wang, Sihong, Long Lin, and Zhong Lin Wang. "Triboelectric nanogenerators as self-powered active sensors." Nano Energy 11 (2015): 436-462).

In its simplest form, a triboelectric generator uses two sheets of such dissimilar materials, one an electron donor, the other an electron acceptor. One or more of the materials can be an insulator. Other possible materials may include semiconductor materials, for example silicon comprising a native oxide layer. When the materials are brought into contact, electrons are exchanged from one material to the other, inducing a reciprocal charge on the two materials. This is the triboelectric effect.

If the sheets are then separated, each sheet holds an electrical charge (of differing polarity), isolated by the gap between them, and an electric potential is built up. If electrodes are disposed on to the two material surfaces and an electrical load connected between them, any further displacement of the sheets, either laterally or perpendicularly, will induce in response a current flow between the two electrodes. This is simply an example of electrostatic induction. As the distance between the respective charge centres of the two plates is increased, so the attractive electric field between the two, across the gap, weakens, resulting in an increased potential difference between the two outer electrodes, as electrical attraction of charge via the load begins to overcome the electrostatic attractive force across the gap.

In this way, triboelectric generators convert mechanical energy into electrical energy through a coupling between two main physical mechanisms: contact electrification (tribo-charging) and electrostatic induction.

By cyclically increasing and decreasing the mutual separation between the charge centres of the plates, so current can be induced to flow back and forth between the plates in response, thereby generating an alternating current across the load. Recently, an emerging material technology for power generation (energy harvesting) and power conversion has been developed which makes use of this effect, as disclosed in Wang, Z. L. "Triboelectric nanogenerators as new energy technology for self-powered systems and as active mechanical and chemical sensors." ACS nano 7.11 (2013): 9533-9557. Based on this effect several device configurations have been developed of so-called triboelectric generators ("TEG").

Since their first reporting in 2012, the output power density of TEGs has been greatly improved. The volume power density may reach more than 400 kilowatts per cubic metre, and an efficiency of ~60% has been demonstrated (ibid.). In addition to high output performance, TEG technology carries numerous other advantages, such as low production cost, high reliability and robustness, and low environmental impact.

The TEG may be used as an electrical power generator, i.e. energy harvesting from, for example, vibration, wind, water, random body motions or even conversion of mechanically available power into electricity. The generated voltage is a power signal.

TEGs may broadly be divided into four main operational classes.

A first mode of operation is a vertical contact-separation mode, in which two or more plates are cyclically brought into or out of contact by an applied force. This may be used in shoes, for example, where the pressure exerted by a user as they step is utilised to bring the plates into contact. One example of such a device has been described in the article "Integrated Multilayered Triboelectric Nanogenerator for Harvesting Biomechanical Energy from Human Motions" of Peng Bai et. al. in ACS Nano 2013 7(4), pp 3713-3719. Here, the device comprises a multiple layer structure formed on a zig-zag shaped substrate. The device operates based on surface charge transfer due to contact electrification. When a pressure is applied to the structure, the zig-zag shape is compressed to create contact between the different layers, and the contact is released when the pressure is released. The energy harvested might be for example used for charging of mobile portable devices.

A second mode of operation is a linear sliding mode, wherein plates are induced to slide laterally with respect to one another in order to change the area of overlap between them. A potential difference is induced across the plates, having an instantaneous magnitude in proportion to the rate of change of the total overlapping area. By repeatedly bringing plates into and out of mutual overlap with one another, an alternating current may be established across a load connected between the plates.

One particular subset of linear sliding mode TEGs which have been developed are rotational disk TEGs which can be operated in both a contact (i.e., continuous tribocharging and electrostatic induction) or a non-contact mode (i.e., only electrostatic induction after initial contact electrification). Rotational disc TEGs typically consist of at least one rotor and one stator each formed as a set of spaced circle sectors (segments). The sectors overlap and then separate as the two discs rotate relative to each other. As described above, a current may be induced between two laterally sliding—oppositely charged—layers, with a magnitude in proportion to the rate of change of the area of overlap. As each consecutively spaced sector of the rotor comes into and then out of overlap with a given stator sector, so a current is induced between the two sector plates, initially in a first direction, as the plates increase in overlap, and then in the opposite direction as the plates decrease in overlap.

A design which enables energy to be harvested from sliding motions is disclosed in the article "Freestanding Triboelectric-Layer-Based Nanogenerators for Harvesting Energy from a Moving Object of Human Motion in Contact and Non-Contact Modes" in Adv. Mater. 2014, 26, 2818-2824. A freestanding movable layer slides between a pair of static electrodes. The movable layer may be arranged not to make contact with the static electrodes (i.e. at small spacing above the static electrodes) or it may make sliding contact.

A third mode of operation is a single electrode mode in which one surface is for example grounded—for example, a floor road—and a load is connected between this first surface and ground (see for example Yang, Ya, et al. "Single-electrode-based sliding triboelectric nanogenerator for self-powered displacement vector sensor system." *ACS nano* 7.8 (2013): 7342-7351.) The second surface—not electrically connected to the first—is brought into contact with the first surface and tribocharges it. As the second surface is then moved away from the first, the excess charge in the first surface is driven to ground, providing a current across the load. Hence only a single electrode (on a single layer) is used in this mode of operation to provide an output current.

A fourth mode of operation is a freestanding triboelectric layer mode, which is designed for harvesting energy from an arbitrary moving object to which no electrical connections are made. This object may be a passing car, passing train, or a shoe, for example. (Again, see "Triboelectric nanogenerators as new energy technology for self-powered systems and as active mechanical and chemical sensors." *ACS nano* 7.11 (2013): 9533-9557).

There are still further designs of triboelectric generator, such as a double-arch shaped configuration based on contact electrification. A pressure causes the arches to close to make contact between the arch layers, and the arches returns to the open shape when the pressure is released. A triboelectric nanogenerator has also been proposed which is formed as a harmonic resonator for capturing energy from ambient vibrations.

State of the art triboelectric nanogenerators, as for example presented by the Georgia Institute of Technology, are presently able to demonstrate only low power outputs in the range of a few milliwatts. In particular, the typical output power of a TEG currently consists of a voltage level in the range of a few hundreds of volts and a current level in the range of a few milliamps. In addition, the output of known TEGs consists of a high frequency regularly repeating pattern of high voltage pulses. This is a result of the periodic layout of electrodes in the known devices, in combination with a relatively high rate of motion.

Such high frequency, high voltage outputs are unsuitable as a direct power supply for many of the most common practical applications, and often require conversion by means of one or more transformer or amplifier circuits before they can be used in powering components. However, certain classes of devices do exist which can be directly driven by such outputs: in particular devices such as electroactive polymer (EAP) devices, LCDs, and electrophoretic devices such as displays or micro fluidic devices (especially those displaying dielectrophoretic behaviours).

Electroactive polymers in particular represent one of the most promising technologies for direct power and control by TEGs, since these materials may be used to form the basis of micro-scale actuator devices which offer the advantage of extremely low mechanical complexity, high reliability and cheap manufacturing costs. The input voltage requirements of EAPs are similar to those levels typically outputted by state of the art TEGs, making them particularly suitable for direct driving. However, while voltage and current levels are well matched, input and output frequencies are not, with TEG output frequencies typically falling in a range of 100 Hz-5000 Hz, but with EAPs more commonly requiring input frequencies closer to a range of 0.1 Hz-10 Hz (to make them suitable for practical applications such as actuation of skin for example).

Moreover, other varieties of generator (e.g. electret based) operating on similar principles, but not specifically utilising the triboelectric effect, also may suffer from this same drawback of providing high voltage outputs at frequencies unsuitable for direct driving of common components. Such generators might include in general any electrical power generator which operates through the relative motion of two or more charged elements, including for example induction-based generators which generate electrical power through electrostatic induction but which do not operate through tribo-charging of mutually moving elements.

One solution to the frequency mismatch of state of the art generators is simply to provide, in addition to the generator, a waveform modifier, such as a transformer or amplifier circuit, which is capable of modifying the output frequency of the generator. Such additional circuitry however, naturally adds power consumption, additional costs and complexity to the overall system and is hence undesirable from the point of view of efficiency, cost and simplicity.

Given the above described inadequacies in state of the art generators, there is a need for a system for generating directly from the relative motion of mutually charged generating elements an electrical output current having particular desired waveform, where said system does not require a dedicated waveform generator or waveform manipulator.

SUMMARY OF THE INVENTION

The invention is defined by the claims.

According to an aspect of the invention, there is provided a device for generating electrical current waveforms, comprising:

an electrical power generator, the generator comprising a first generating arrangement (32), configured to generate a first electrical output current having a first frequency, and a second generating arrangement (34), configured to generate an second electrical output current having a second frequency, each configured to generate an electrical output current, and each arrangement comprising a first set of generating elements and a second set of generating elements, at least the first set of which is configured to hold an electrical charge, and which are configured to be movable with respect to one another to generate an electrical output current; and a connecting circuit providing electrical connection between the first and second generating arrangements (32, 34), and adapted to combine the first electrical output current and the second electrical output current to thereby generate from the device a resultant output current having a particular determined waveform having a third frequency differing from the first and second frequency.

The invention is based upon the principle of combining or superposing output waveforms of multiple generator arrangements. For example, each arrangement may be adapted to generate an output waveform having a different frequency (i.e. the frequency of one generating arrangement is different to the frequencies of the other generating arrangements), in order to thereby provide an overall resultant output waveform having a particular desired waveform. The particular desired waveform then comprises a waveform with a desired frequency.

As is well known, when sinusoidal signals having slightly differing frequencies are superposed, the result is a modulated signal, comprising a high frequency signal component fluctuating within the envelope of a low-frequency oscillating amplitude. The frequencies of both the high frequency signal and of the envelope are directly dependent upon the frequencies of the two or more component signals which are superimposed. By carefully selecting the frequencies of the component signals therefore, any of a wide (continuous) range of possible resultant waveforms may be produced. As the number of component signals increases, so too does the range of achievable waveforms, with this range expanding to encompass all possible waveforms in the ideal limit of an infinite series of component signals (i.e. a Fourier series).

By providing multiple generator arrangements, each adapted to generate output currents of a particular predetermined frequency, an overall resultant output current may be formed—from a combination of these multiple component outputs—which has a waveform which is determinable in advance. By carefully choosing the output frequencies of the plurality of generator arrangements, therefore, an electrical output waveform may be provided by embodiments of the invention having any of a range of particular desired waveforms, where the range is constrained according to the total number of generating arrangements provided.

The frequency of the output waveform provided by each generating arrangement may be dependent upon the structure, material composition and/or mechanical arrangement of the first and second set of generating elements comprised by that arrangement. This may include, by way of non-limiting example, the size and/or shape of the generating elements or the geometrical pattern in which the sets of elements are arranged for instance.

In examples, the two or more of the plurality of generating elements might be adapted to generate output currents having differing peak voltages or amplitudes. In this way, not only the frequency of the resultant output waveform of the device, but also the peak amplitude of said waveform, may be controlled.

In examples, both sets of generating elements comprised by each arrangement may be adapted to hold an electrical charge, or only one may be adapted to hold a charge. In either case, generating elements of the first set should have a differing electrical charge to elements of the second set, in order to facilitate the electrostatic induction of power by means of relative motion between the two sets of elements.

According to one example group of embodiments, the electrical power generator may comprise one or more triboelectric power generators. In this case, the sets of generating elements may comprise sets of triboelectric electrodes or sets of surfaces of triboelectric material, adapted to generate current electrostatically, in response to mutual displacement.

In certain particular examples of such embodiments, each generator arrangement may be a separate triboelectric generator, with first and second sets of generating elements being comprised by first and second triboelectric generator plates, adapted to move relative to one another to generate a current. In alternative examples, however, two or more generating arrangements may be comprised as part of a single triboelectric generator. For example, there may be provided a triboelectric generator comprising three or more stacked generator plate elements, adapted to move relative to one another to generate output currents. In this case, each plate element may comprise one or more sets of generating elements for example. Alternatively again, there may be provided a triboelectric generator comprising just two generator plates, but wherein each plate comprises a plurality of sets of generator elements, for example a first plate comprising first sets of generator elements, and second plate comprising second sets of generator elements.

Embodiments of the invention are not limited to triboelectric-based generation, however, and may comprise any variety of power generator which operates through the relative motion of two or more charged elements, including for example induction-based or micro-electret generators which generate electrical power through electrostatic induction but which do not operate through tribo-charging of mutually moving elements.

According to these, or to any other example embodiments of the invention (including triboelectric based embodiments), the electrical power generator may comprise at least a first plate element and a second plate element, configured to be moveable with respect to one another, and wherein the first plate element comprises two or more of the first sets of generating elements of the plurality of generator arrangements, and the second plate element comprises two or more of the second sets of generating elements of the plurality of generator arrangements.

In more particular examples, the first and second sets of generating elements may form respective first and second sets of surface portions of the first and second plate elements.

The plate elements may be disk elements configured to be rotatable relative to one another. In this case, the two or more first sets of generating elements of the first plate element may form different respective annular arrangements of surface portions of the first plate element and the two or more second sets of generating elements of the second plate element may form different respective annular arrangements of surface portions of the second plate element.

In an alternative set of examples, the two or more first sets of generating elements of the first plate element may form different respective sector surface portions of the first plate element and the two or more second sets of generating elements of the second plate element form different respective sector surface portions of the second plate element.

According to one or more example embodiments, the dimensions of the generating elements of different generating arrangements, along the direction parallel to the direction of relative motion between the first and second set of generating elements of the arrangement, may be different. The dimensions of the generating elements of a given set may, together with other parameters, affect the output frequency and overall waveform of the current generated by said set. For a given pattern or arrangement of generating elements, a larger number of narrower (along the direction of relative motion between elements) elements will generate a higher frequency output than a smaller number of wider elements for example. In addition, wider elements (along the direction of relative motion between elements) will tend to generate output signals of greater amplitude than narrower elements.

Alternatively or in addition the separation distance between component generating elements of different generating arrangements, along the direction parallel to the direction of relative motion between their respective first and second sets of generating elements may be different. This may affect both the frequency and the overall waveform of the output currents of each generator element. Narrow, widely spaced elements for example may generate a waveform comprising sharp, narrow pulses of current, whereas wide and closely spaced elements may generate a waveform comprising a smoother, more continuous waveform.

The material composition of the generating elements of different generating arrangements may in some embodiments be different. The material composition may affect the quantity of charge which can be held by the generating element for example, this in turn affecting the current profile (for example the peak voltage) which may be generated by the respective generating arrangement.

In accordance with one or more embodiments, the relative motion between the first and second set of generating elements of each of the generator arrangements may be dependent on a mechanical coupling between said first and second set, wherein the physical properties of said mechanical coupling differs for each of the respective generating arrangements. These embodiments might comprise for example one or more contact-separation mode type triboelectric generator arrangements, in which two or more plates are cyclically brought into or out of contact by an applied force. Here, the physical properties of the mechanical coupling mediating the contact and separation of the plates may be adjusted to affect the rate of contact and separation in response to a given applied force, for example, where this rate will in turn affect the waveform profile of the generated output current. A faster rate will produce a higher frequency output, while a slower rate will produce a lower frequency output.

In one example, the mechanical coupling may comprise a spring coupling, the spring coupling for each generating arrangement having a different spring constant.

In other examples, the relative motion between the first and second set of generating elements of each of the generator arrangements may be dependent upon a hinge coupling, wherein the maximal angular extension of the hinge coupling differs for each of the respective generating arrangements. The maximal angular extension of the hinge coupling may affect the rate at which the respective hinged generating elements are brought together or moved apart in response to some given applied force, for example, this in turn affecting the output waveform of the generated current (for example the frequency of the generated current).

According to one or more embodiments, the connecting circuit may provide a series connection between the plurality of electrical output currents.

The connecting circuit may in some cases comprise a filter circuit. The filter circuit might for example comprise a peak detector circuit. This may allow for a resultant modulated output current generated through superposition of the multiple output currents of the plurality of generator arrangements to be filtered to leave only the low-frequency component provided by the oscillating amplitude envelope. In this way, a low frequency output signal may be generated from the plurality of higher frequency generator outputs.

Examples in accordance with another aspect of the invention provide an actuator, comprising:

a device for generating electrical current waveforms in accordance with one or more of the example embodiments described above; and an actuator structure in electrical connection with said device and comprising an electroactive polymer material element.

According to a further aspect of the invention, there is also provided a method of generating an electrical output current by means of an electrical generator, the generator comprising a plurality of generating arrangements, electrically connected by means of connecting circuit, each configured to generate an electrical output current having a different frequency, and each arrangement comprising:

a first set of generating elements and a second set of generating elements, at least one of which is configured to hold an electrical charge, the method comprising:

inducing relative motion between the first and second sets of generating elements of each of the plurality of generating arrangements, to thereby generate a plurality of output currents; and combining the plurality of generated output currents to thereby generate a resultant output current having a particular determined waveform.

This method is able for example to generate an output current of a predetermined frequency.

BRIEF DESCRIPTION OF THE DRAWINGS

Examples of the invention will now be described in detail with reference to the accompanying drawings, in which:

FIG. 5 illustratively depicts a modulated combined output signal as may be generated by example waveform generating devices, and a corresponding filtered output signal for application to an EAP actuator;

FIG. 6 shows a second example waveform generating device;

FIG. 7 illustrates an example electrode pattern for the rotor and/or stator of the second example waveform generating device;

FIG. 8 illustratively depicts example electrical outputs generated by different generating regions of the second example device;

DETAILED DESCRIPTION OF THE EMBODIMENTS

Figure 1:
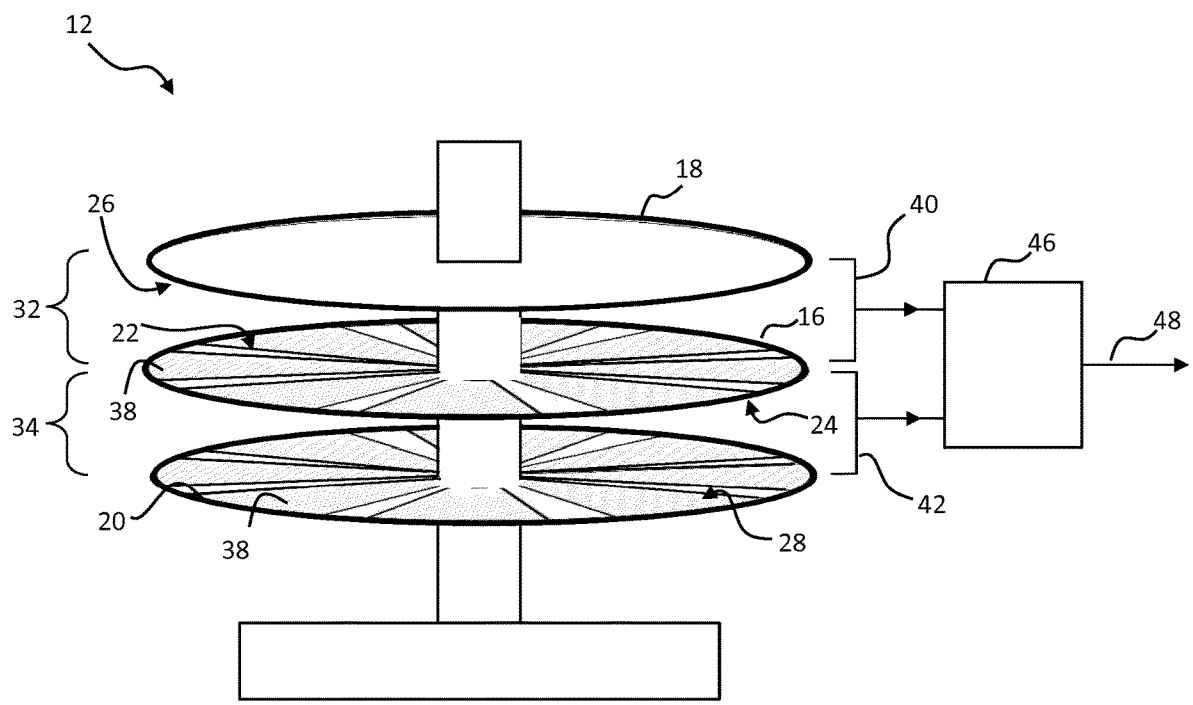
FIG. 1 shows a first example waveform generating device.

The invention provides a device for generating electrical currents of a particular desired waveform through the combining of a plurality of different frequency output currents generated by plurality of power generating arrangements. The power generating arrangements each comprise at least first and second sets of generating elements, configured to hold a relative charge and to be moveable with respect to one another in order to generate an electrical output current of a particular frequency.

According to one particular set of example embodiments, the power generating arrangements are comprised by or constitute one or more triboelectric power generators. These are characterised in that the relative charge between first and second sets of generating elements of each generating arrangement is established and maintained by means of intermittent periods of physical contact, during which reciprocal charge is built up on the elements of each set (a process of tribo-charging). These embodiments require that the generating elements be composed of materials which are triboelectrically active (which form part of the 'triboelectric series').

A variety of example embodiments incorporating triboelectric-based generator arrangements in particular will now be described in detail, by way of illustration of the principles of the invention. However, it should be understood that the concepts illustrated by these examples are not limited to particular application to triboelectric-based systems, but in fact may apply to any of a range of particular power generator arrangements. Such generators might include in general any electrical power generator which operates through the relative motion of two or more charged elements, including for example induction-based generators which generate electrical power through electrostatic induction but which do not operate through tribo-charging of mutually moving elements. In each described embodiment, it should be understood that a provided triboelectric-based generator may be equally well replaced by a different variety of generator, without undermining the key advantages conferred by the described arrangement over existing state of the art devices.

As explained above, it is desirable to be able to create specific driving waveforms (periodic or aperiodic) and amplitudes directly from a generating device, without the requirement to provide additional complex waveform manipulating circuits. This is in particular the case where it is desired to drive components which require input frequencies which differ from the typical output frequencies generated by induction-based generator devices. One example class of such a component is electroactive polymer (EAP)-based devices, such as EAP-based actuator devices. These require input currents of a frequency significantly lower than the frequency of currents provided by a typical triboelectric generator (TEG) for instance.

In the prior art, generating waveforms to power EAPs is typically realised by means of dedicated electronics, wherein, for example, power is sourced from a battery and converted into a high voltage, and thereafter this high voltage is used to power a high voltage amplifier which creates the desired waveform to power the EAP.

Embodiments of the present invention propose to provide the required driving waveform instead through the mixing of multiple output waveforms generated by multiple individual TEGs, or provided by a single TEG being adapted to generate multiple output waveforms in synchronicity. The combining of multiple, slightly differing, output waveforms allows the generation, directly from a generating device, of a resultant output current having a low frequency driving signal which may be used in examples to power EAP devices.

FIG. 1 shows a simple first example of a waveform generating device in accordance with embodiments of the invention. The device comprises a rotating-disk triboelectric generator 12, the generator having a single rotor 16 and two stators 18, 20. The first stator and the upper surface 22 of the rotor form a first generating arrangement 32 and the second stator and lower surface 24 of the rotor form a second generating arrangement 34.

The upper surface 22 of the rotor comprises a circumferential arrangement of triboelectric material surface portions 38, or triboelectric electrodes, to form a first set of generating elements for the first generating arrangement 32. The lower surface 26 of the first stator comprises a co-operatively spaced arrangement of triboelectric material surface portions, or triboelectric electrodes, to form a second set of generating elements for the first generating arrangement 32.

The upper surface 28 of the second stator 20 comprises a circumferential arrangement of triboelectric material surface portions 38, or triboelectric electrodes, to form a first set of generating elements for the second generating arrangement 34. The lower surface 24 of the rotor 16 comprises a co-operatively spaced arrangement of triboelectric material surface portions, or triboelectric electrodes, to form a second set of generating elements for the second generating arrangement 34.

Figure 2:
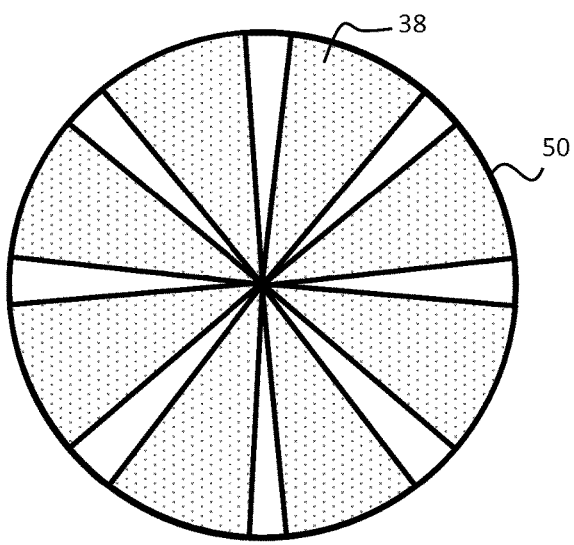
FIG. 2 shows an example pattern of triboelectric electrodes in accordance with the first example waveform generating device.

FIG. 2 shows a top down view of the circumferential arrangement of triboelectric material surface portions 38, or triboelectric electrodes, as may be comprised by surfaces of the rotor 16 or first 18 or second 20 stators in examples of this embodiment. The surface portions form circumferentially separated sector regions of the disk element 50 to which they are coupled. The particular pattern shown is for illustration only and it should be understood that in examples of this embodiment, the spacing, arrangement, or configuration of the surface regions 38 may differ. Indeed, as will be discussed below, for the particular example of FIG. 1, the particular pattern or arrangement of surface portions is different for each of the two stators (with corresponding reciprocal arrangements provided on each of the upper 22 and lower 24 surfaces of the rotor).

As discussed previously, a rotating disk TEG is a particular subset of linear sliding mode TEGs in which power is generated through the successive overlap and then separation of spaced circle sectors of triboelectrically active material formed on opposing surfaces of mutually rotating disk elements. As described above, a charge may be induced between two laterally sliding—oppositely charged—layers, with a magnitude in proportion to the rate of change of the area of overlap. As each consecutively spaced sector of the rotor comes into and then out of overlap with a given stator sector, so (in the presence of a load) a current is induced between the two sector plates, initially in a first direction, as the plates increase in overlap, and then in the opposite direction as the plates decrease in overlap. The result is an alternating current having a peak amplitude which is related, inter alia, to the surface area and material composition of the triboelectric surface portions, and having a frequency which is related, inter alia, to the relative speed of rotation between the disks and to the relative spacing or pitch of the pattern of triboelectric surface portions.

As the rotor 16 of the embodiment of FIG. 1 rotates, the relative rotation of surface portions 38 of the rotor and of the first stator 18 generates an output current 40 from the first generating arrangement having a first frequency which is related to the particular arrangement of the surface portions on the lower surface 26 of the first stator. Simultaneously, the relative rotation of surface portions of the rotor and of the second stator 20 generates a second output current 42 from the second generating arrangement 34, having a second frequency which is related to the particular arrangement of the surface regions of the second stator. The first and second stators are configured to have surface portion 38 patterns or arrangements which are slightly different from one another (for example comprising differing spacing between respective surface portions) such that first and second output currents are formed having slightly differing frequencies.

The electrical outputs of the two generating arrangements are electrically connected to a combiner circuit 46 which combines or mixes the two output currents, thereby producing a third resultant output current 48 which is formed of a combination of the two.

Figure 3:
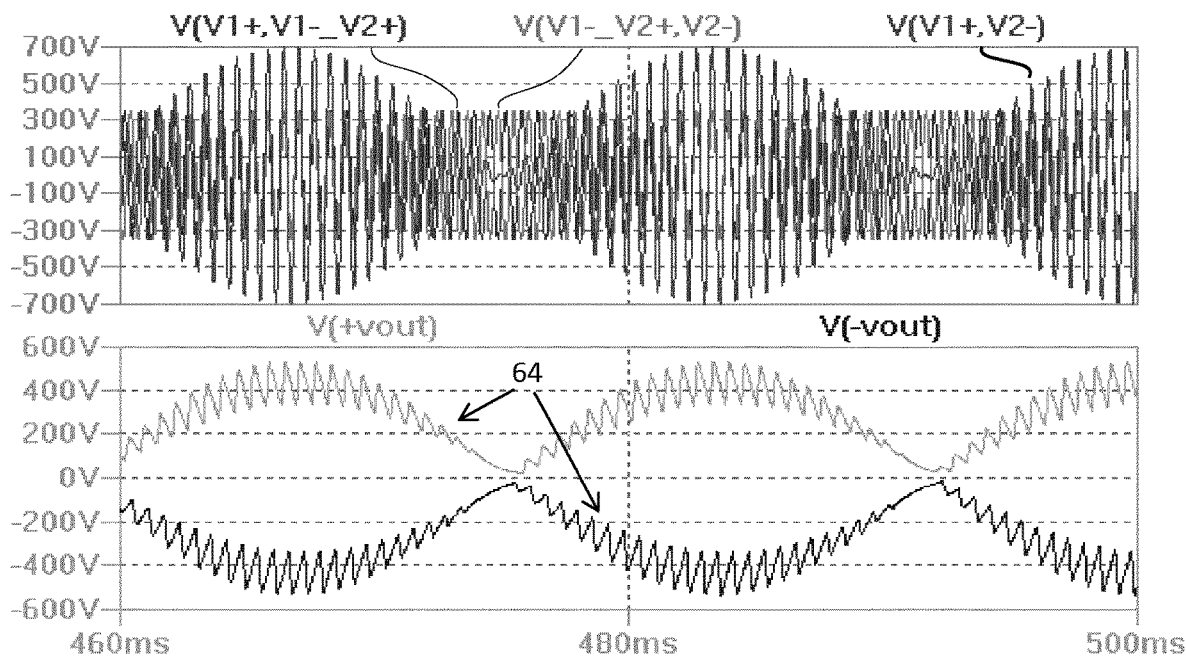
FIG. 3 illustratively depicts an example waveform output as generated by example waveform generating device.

If two DC direct current voltage sources are connected in series with each other, the total output will be the sum of the two input voltages. The same principle also applies for AC voltage sources. However, here the phase shift between the two signals also needs to be taken into account. If the signals are in phase, the amplitude of the total output would be equal to the sum of the amplitudes of the two input sources. If the phase shift is 180° between the two voltage sources, the result would be zero output.

Where the two sources differ in their frequencies (as in embodiments of the present invention) the result is a modulated output signal which is depicted illustratively (labelled V(V1+, V2−)) in the top (upper) graph shown in FIG. 3. This shows two source signals (from a first and second generator arrangement) having the same amplitude but slightly differing frequencies which are combined to form an AM (amplitude modulated) signal. V(V1+,V1−_V2+) represents the output voltage of a first example generating arrangement, V(V1−_V2+, V2−) represents the output voltage of a second example generating arrangement and V(V1+,V2−) represents the combined output voltage of the first and second generating arrangements. The locations at which voltages V1+, V1−_V2+ and V2− arise in the circuit can be seen in FIG. 4. V1−_V2+ denotes that the voltage V1− on the negative side of the first generator TEG1 is the same as the voltage V2+ on the positive side of the second generator TEG2 because they are connected in series.

The envelope 64 of the modulated signal V(V1+, V2−) oscillates at a frequency which is equal to the difference between the two input frequencies. Where the two frequencies differ only slightly, the envelope may have a much lower frequency than the input frequencies. This low frequency may be designed (through careful engineering of the two input frequencies) to be suitable for direct driving of a low input frequency component such an electroactive polymer (EAP) device (e.g. an EAP actuator).

Figure 4:
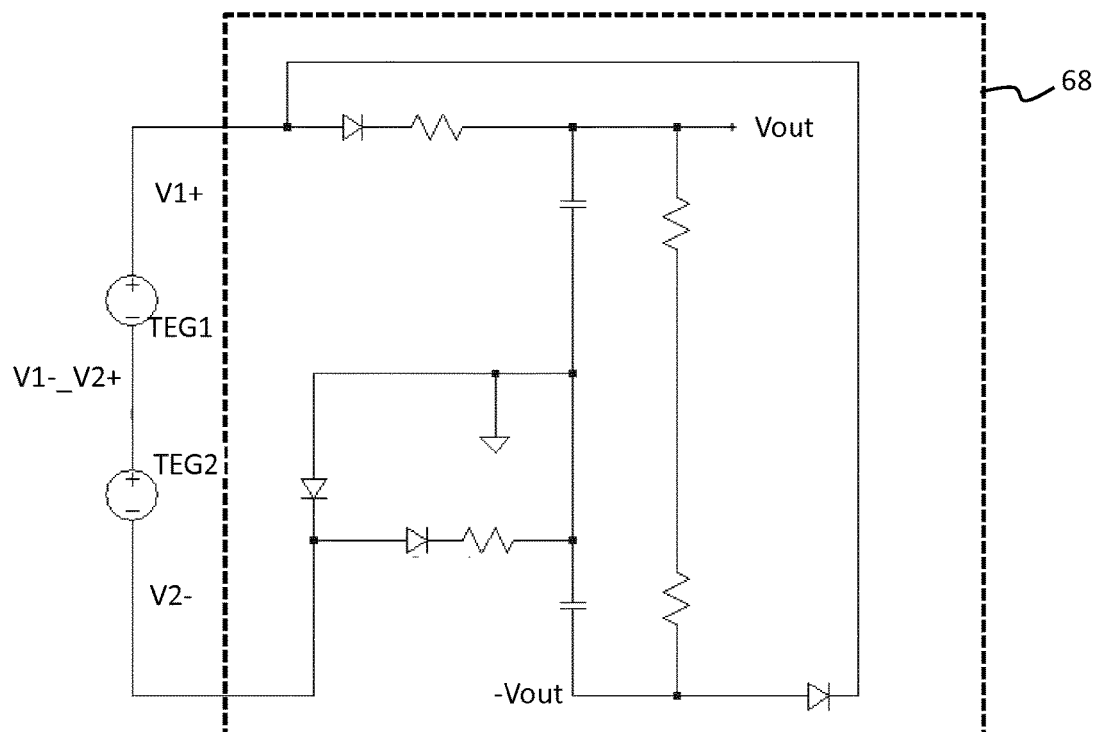
FIG. 4 shows an example combiner circuit in accordance with an example waveform generator device.

However, the combined output signal V(V1+, V2−) does, on its own, still comprise high frequency components that would need to be filtered out prior to application of the signal to an EAP device. This might be achieved, in examples, through means of a combiner circuit 68 which comprises one or more half wave rectifier circuits. The bottom graph of FIG. 3 illustrates an example output waveform generated by passing the AM signal V(V1+, V2−) through a filter circuit comprised of two half-wave rectifiers (one for positive voltages and the other for negative voltages). V(+out) represents the output signal of the positive half wave rectifier. V(−out) represents the output signal of the negative half wave rectifier. FIG. 4 shows one example electrical configuration for the device of FIG. 1, comprising a half wave rectifier circuit 68.

The circuit of FIG. 4 is an example of a half wave rectifier having diodes associated with the two terminals and low pass RC filters. Other half wave rectifier or envelope detector circuits may of course be used.

Once passed through the half wave rectifiers, the resultant voltage waveform appears as a rectified signal of the envelope signal including a small ripple. However, EAPs that are intended for operation at low frequencies typically have a fairly large capacitance, and this large capacitance will naturally act to filter the high frequency ripple even further.

In FIG. 5 is schematically depicted a representation of the envelope of the combined TEG output signals 64 and, above it, the resultant filtered output waveform 70, once this combined signal has passed through the half wave rectifier 68 of FIG. 4.

The design of the TEG 12 is configured such that the first and second generating arrangements produce output currents having differing frequencies. One way of achieving this would be to provide to the first and second stators (and co-operatively to the upper 22 and lower 24 surfaces of the rotor) respective patterns of generating elements (triboelectric surface regions 38, or triboelectric electrodes) having differing respective circumferential spacing. In this way, as the rotor 16 rotates at a given speed, the pattern having a narrower spacing produces an output current with a higher frequency and the pattern having a wider spacing produces an output current having a lower frequency.

In alternative embodiments, the differing frequencies may be provided in different ways. For example, although the particular example of FIG. 1 comprises a single rotor and two stators, in alterative examples, the arrangement may instead comprise a single stator with two accompanying rotors. In this case, a different rate of relative rotation may be induced between the two respective patterns of surface portions of the two generating arrangements, with a first rotor induced to rotate at a first speed relative to the single stator and the second rotor induced to rotate at a second speed relative to the single stator. In this way, the pattern of generating elements (surface portions or electrodes) provided to the surfaces in each of the generating arrangements may be the same, but the differing rates of rotation induced between the plates of the two arrangements ensures that output currents are generated from each which have different frequencies.

In further examples, the generator may comprise more than two rotors and/or stators, such that three or more generating arrangements are for example provided by a single generator. In some examples a plurality of the generators 12 shown in FIG. 1 may be provided, for example connected in series, each comprising two generating arrangements, each generating arrangement configured to provide an output current having a differing frequency and/or waveform. In further examples still, the two or more generating arrangements may each simply be provided by separate single rotor-single stator TEGs, each configured to generate an output current having a differing frequency.

Furthermore, although the example of FIG. 1 comprises a rotating disk triboelectric generator, in alternative examples, the power generation may instead be provided by an alternative variety of TEG arrangement. This might include for example a different variety of linear sliding mode TEG. In this case, a directly analogous arrangement to the one provided by the example of FIG. 1 might feature for instance a single sliding generator plate element arranged sandwiched between two static plate elements. As with the example of FIG. 1, the moving element is in this case provided with slightly differing patterns of triboelectric surface portions on upper and lower surfaces, and the static elements are provided with co-operating patterns on their lower and upper surfaces respectively. In further examples, any variety of TEG or other induction-based generating arrangements may alternatively be considered.

For each of the examples discussed above, multiple generating arrangements are in each case provided, each configured to generate an output current having a differing frequency, wherein each generating arrangement requires the provision of a separate, dedicated generator plate or generating member. According to a second set of embodiments, however, examples of which will be described in detail below, multiple generating arrangements of differing output frequencies may be provided by means of a single TEG generator comprising only two relatively moving generating plates or members. This allows for reduced cost, complexity and form factor of the overall system.

In these embodiments, multiple output currents are generated from a single pair of generator plate members through dividing each plate member into multiple respective generating regions, each region comprising its own (slightly differing) pattern or arrangement of triboelectric surface portions or triboelectric electrodes. The outputs of these multiple regions are then combined together by means of a provided combiner circuit in order to generate a single resultant output waveform.

A simple first example of such an embodiment is shown in FIG. 6, in which is provided a rotating disk triboelectric generator 80, comprising a single rotor 82 and single stator 84. The rotor and stator each comprise two different generating regions, the generating regions each comprising a respective annular portion of the surface of each disk. The first generating region of the rotor and the co-operatively spaced and sized first generating region of the stator form a first generating arrangement, which generates an output current having a first frequency. The second generating region of the rotor and the co-operatively spaced and sized second surface region of the stator form a second generating arrangement, which generates an output current having a second frequency. The current outputs of the two generating arrangements are combined by means of a combiner circuit 46 to form a single resultant output waveform which may be used to directly drive one or more components.

One example configuration of triboelectric surface regions for the rotor 82 and stator 84 is shown in FIG. 7. The lower and upper surface of the rotor and stator respectively are divided into two annular generating regions 100, 102, each region comprising a respective pattern of circumferentially arranged triboelectric surface portions or electrodes 38. The pattern or arrangement is slightly different for each of the generating regions. In this particular example, there are a greater number of triboelectric electrodes provided to the outer annular generating region 100 than to the inner annular generating region 102. The rotor rotates at a given speed, and the speed difference between the inner and outer generating regions is a fixed ratio. By providing fewer electrodes to the inner regions, this means that, for a given relative speed of rotation of the disks, the inner region generates an output current having a lower frequency than the outer region (since over the course of any given full rotation of the disks, the signal generated by the inner region will comprise fewer peaks than the signal generated by the outer region).

FIG. 8 schematically illustrates the respective output signals 110, 112 generated by the inner 100 and outer 102 generating regions. By adjusting the total number of electrodes 38 provided to each generating region, and/or the areas of the electrodes provided, the frequencies of the two output currents may correspondingly be adjusted, and the resultant combined output thereby attuned to form a particular desired waveform.

Figure 9:
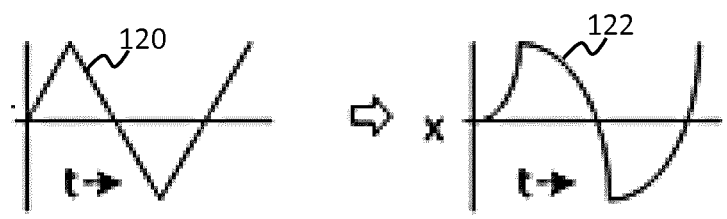
FIG. 9 depicts an example combined output waveform as may be generated by the second example device, and a corresponding deflection of an EAP actuator driven by said output waveform.

The resultant output waveform may for example be attuned so as to be suitable for driving an electroactive polymer based actuator. FIG. 9 schematically illustrates the induced deflection (x) 122 over time of an example EAP actuator in response to a generated low-frequency output current 120, produced through the combining of the two component output currents 110 and 112.

In examples, the particular material composition of the triboelectric electrodes 38 may differ for each of the different generating regions 100, 102. Different materials may allow for generation of output currents having different voltage amplitudes, and hence careful selection of materials for each region allows optimisation of the device for specific voltage amplitude(s) of the resultant combined output waveform.

Although in the example of FIGS. 6 and 7, the rotor and stator each comprise two annular generating regions, in alternative examples, the disks may be divided into a greater number of generating regions, for example three or more, for example four or more. As the number of generating regions increases (and hence the number of component output signals increases), the range of achievable resultant waveforms expands. Hence, the greater the number of generating regions, the greater the flexibility of the device in terms of the waveforms which it is able to generate.

Figure 10:
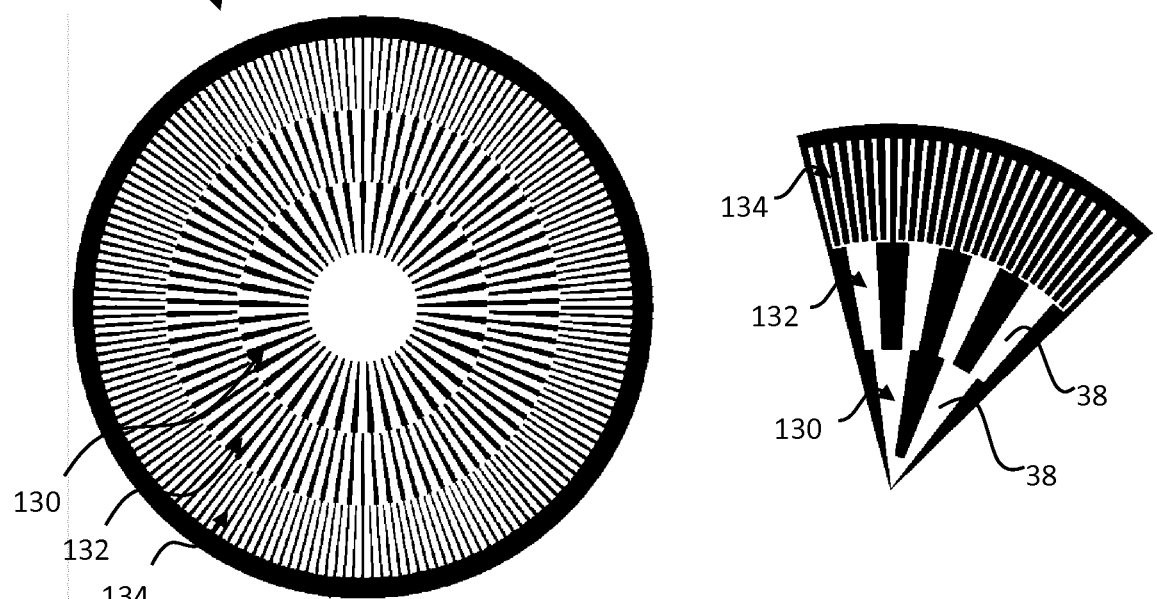
FIG. 10 depicts an example electrode pattern for the rotor and/or stator in accordance with a third example waveform generator device.

FIG. 10 illustrates an example triboelectric surface region pattern 130 for provision to the rotor and stator in accordance with a second, slightly variant example embodiment. According to this second example, each of the rotor and stator are, as in the example of FIGS. 6 and 7, divided into multiple annular generating regions 130, 132, 134, each region comprising a respective circumferentially arranged pattern of triboelectric surface portions (or triboelectric electrodes) 38. However, in the present example, the patterns of each generating region are electrically interconnected, with each single electrode of the inner-most region 130 branching into two or more electrodes as it enters the next inner-most region 132, and then again as it enters the next inner-most region 134, and so on for as many regions as are provided. Each consecutive annular region hence comprises double (or more, depending upon the particular branching structure) the number of triboelectric electrodes (surface portions) 38 as the preceding region, and in this way, each generating region is adapted, upon relative rotation of the rotor and stator, to generate an output current having a differing frequency. The inner most region 130 generates the lowest frequency signal, while the outer-most region 134 generates the highest frequency signal, with each consecutive annular region in-between generating a signal of a frequency between the two.

The branching of the electrodes essentially forms a circumferentially arranged pattern of electrode 'tree' structures, each tree stemming from a single one of the inner-most electrodes, and expanding circumferentially outwards as it extends in a radial direction across the multiple annular generating regions. Each tree comprises electrodes from each of the plurality of generating regions, these electrodes all connected in series. Hence the electrical output of each tree, as the rotor rotates, comprises a 'pre-mixed' signal, formed of a combination, or superposition, of the output frequencies of electrodes of each of the generating regions. If the branching structure of each tree is the same, then the mixed output signal generated by each will also be the same. By simply combining the outputs of all of the trees therefore, an overall output from the device may be provided, having a waveform which is the same as that for each individual tree, but having an amplitude equal to the sum of the peak amplitudes of each of the individual tree signals.

Note that the term 'mixed output' does not necessarily imply limitation to a perfectly smooth mixed output, having for instance a clear single frequency. In some cases, the 'mixing' (i.e. superposition) of the component tree signals may produce an output waveform still composed of multiple clearly distinguishable frequency components. For example, it would be possible to generate an output waveform comprising a 1 KHz signal (for instance), with a clearly separate 5 KHz signal spaced in-between. In this case, the combined or superpositioned output is not a smooth mix of signals, but rather comprises a waveform in which spikes of various frequencies are still clearly visible.

Hence in this embodiment, the combiner circuit is at least partially provided by the electrode structure of the TEG disk itself. In addition, in examples, there may also be provided further combiner circuit elements, such as for example a filter circuit (e.g. a peak detector circuit) as in the example of FIG. 1 for instance.

Figure 11:
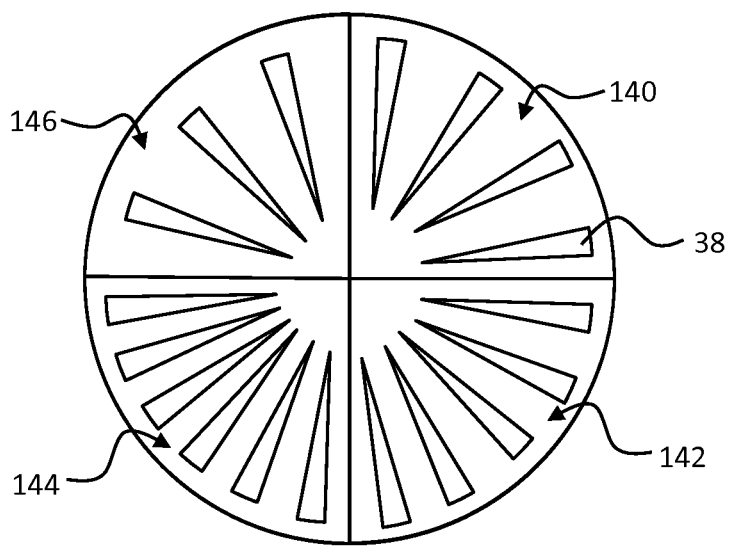
FIG. 11 depicts an example electrode pattern for the rotor and/or stator in accordance with a fourth example waveform generator device.

The multiple generating regions need not be annular surface regions. In FIG. 11 is shown an example configuration of electrodes in accordance with further example embodiment in which a rotating disk TEG is provided having single rotor and single stator, wherein at least one of the two disks comprises multiple circumferentially arranged generating domains or regions 140, 144, 146, 148. Each of the generating regions forms a wedge or sector region of the disk, with each sector comprising a slightly differing circumferential pattern or arrangement of triboelectric surface portions (electrodes) 38. In the particular example of FIG. 11, each generating region comprises a differing number of triboelectric electrodes, having a correspondingly different pitch or spacing between them. Hence as the rotor rotates, the pattern of each generating region generates an output current having a slightly differing frequency.

Once again, by combining the outputs of each of the regions, an overall resultant output may be produced having a waveform which is dependent upon the individual frequencies generated by each region. By optimising the surface area of the electrodes of each region, and also the numbers of electrodes provided to each region, the resultant combined output may be attuned to a particular desired waveform.

In examples of this embodiment, different materials may additionally be used for the triboelectric surface portions of each generating region, in order to adjust the voltage amplitudes generated by each region. In addition, in some examples, both the rotor and stator may be provided with exactly reciprocal electrode arrangements, while in other examples, the electrode patterns may differ. For example, only the stator may be provided with the pattern of FIG. 11, while the rotor simply comprises a standard, uniform pattern equally spaced electrodes, with no multiplicity of regions at all. Such an embodiment would still produce the desired effect of multiple output signals of differing frequencies (one for each of the different regions of the stator) but without the need to provide the more complex pattern of electrodes to both of the disk elements.

As mentioned above, for the purposes of the invention, the provided power generator need not in general be a rotating disk type generator: the principles of the invention may be applied to any of a wide range of different generators of differing operational modes.

Figure 12:
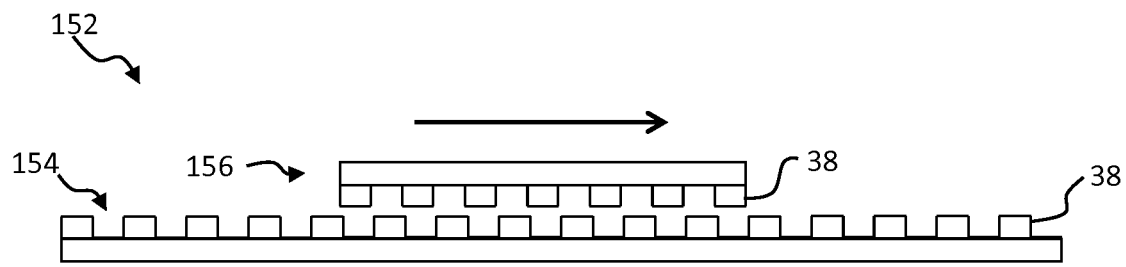
FIG. 12 depicts a side view of a fifth example waveform generator device.
Figure 13:
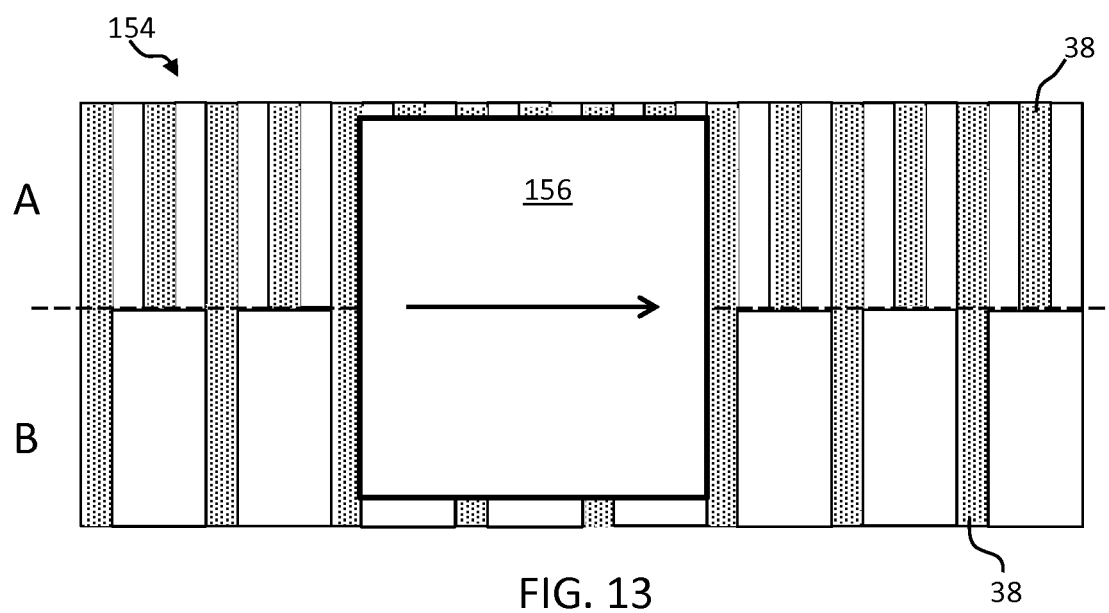
FIG. 13 depicts top-down view of the fifth example waveform generator device.

In FIGS. 12 and 13 is illustrated an example embodiment comprising a linear sliding mode TEG 152. The TEG comprises a stator plate 154 and slider plate 156, each comprising a plurality of triboelectric surface portions (or triboelectric electrodes) 38. As shown in FIG. 13, the width of the stator plate is divided into two different generating regions (A and B), each comprising a slightly differing linear arrangement of triboelectric electrodes 38. In the particular example of FIG. 13, the pattern of region B comprises fewer electrodes per unit length than the pattern of region A. Although not shown, the lower surface of the slider is also divided into two co-operative generating regions, each comprising a reciprocal pattern of triboelectric electrodes. As the slider 156 is moved linearly along the length of the stator 154, the relative motion between the electrodes of the stator and slider generates two output currents: one for each of the generating regions A and B. The output current for region A will have a higher frequency than the output current of region B, since for a given linear speed of the slider, a greater number of electrodes are passed per unit time across region A than across region B.

The outputs for the two regions are combined by means of a combiner circuit (not shown) in order to thereby generate a resultant combined output current having a particular waveform. By optimising the surface area of the provided electrodes 38, the voltage amplitude of the output current of each of the generating regions may be varied.

Note that in variations on the example of FIGS. 12 and 13, the slider itself may not comprise multiple different generating regions, each having a pattern of electrodes arranged to co-operate with the electrodes of the stator, but may instead comprise a single uniform pattern of electrodes extending across its entire width, or may be divided into two generating regions, but wherein each region comprises the same pattern of electrodes.

In various examples, the patterns of triboelectric electrodes provided to each of the generating regions may vary in a number of different ways. For example, the electrodes of differing regions may have a different material composition, have a different surface area, a different angular orientation, have differing outer dimensions, or comprise different geometric shapes.

Figure 14:
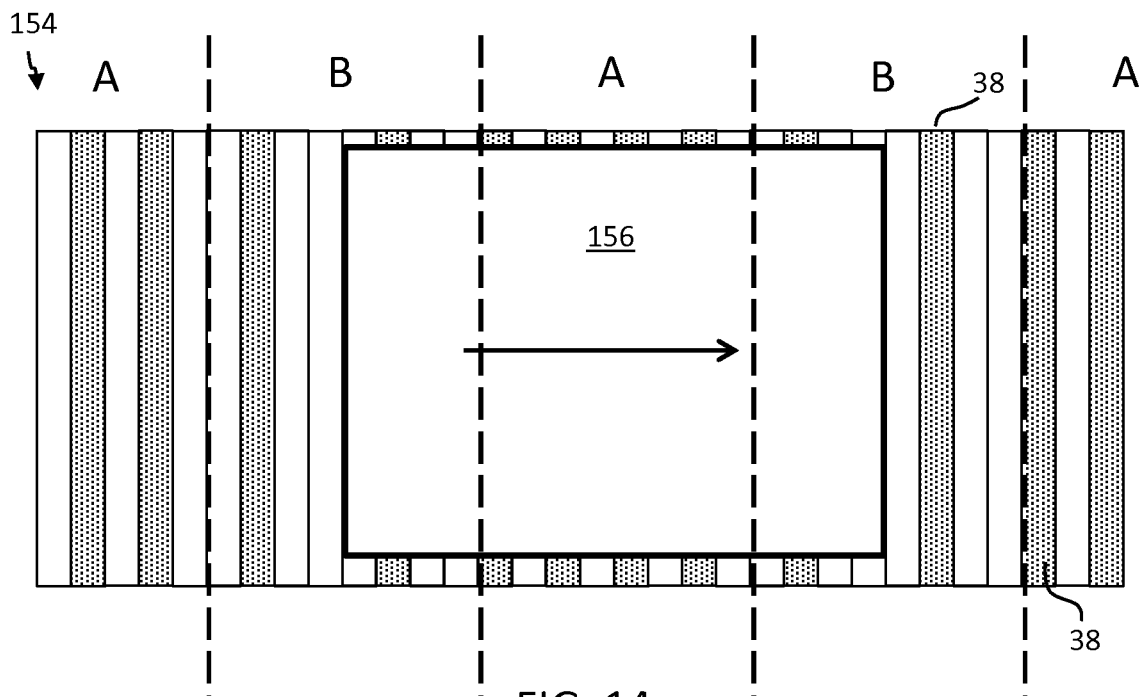
FIG. 14 depicts a sixth example waveform generator device.

In FIG. 14 is shown a variation on the example of FIG. 13, wherein a linear sliding mode TEG is provided having multiple generating regions arranged along its length, rather than its width. According to this embodiment, the length of at least the stator alternates between a first generating region (A) comprising a first linear pattern of electrodes 38 and a second generating region (B) comprising a second linear pattern of electrodes 38. The patterns of generating regions A and B comprise differing numbers of triboelectric electrodes 38, having correspondingly different spacing; region A comprising a denser pattern than region B. As the slider 156 moves linearly over the stator 154, electrodes provided to the lower surface of the slider couple with the electrodes of the generating region over which they are passing, to thereby generate an output current of a particular frequency.

In examples, the stator may be provided having a length equal to the length across a single pair of consecutive generating regions A, B (as shown in FIG. 14). In this way, at any given time, exactly half of the slider is covering portions of a region A section of the stator and half if covering portions of a region B section of the stator. Hence at any given time, half of the electrodes of the slider are coupling with the denser pattern and half are coupling with the narrower pattern, meaning that the overall resultant output current generated across stator and slider comprises a mix of exactly half of a lower frequency signal (form region B) and half of a higher frequency signal (region A).

In alternative examples, the slider may have the same length dimension as the stator. In addition, in differing examples, stators may be provided comprising more than two different generating regions, for example a series of three or four different generating regions, which repeat cyclically along the length of the stator.

In some cases, the electrodes of the different generating regions may be made of different materials. This may allow the output currents from each generating regions to optimised for particular desired voltage amplitudes for example. In addition the patterns of electrodes may differ between the generating regions in a variety of different ways. As in the previous example of FIG. 13, these may include, by way of example, triboelectric electrodes having different surface areas, different angular orientations, differing outer dimensions, or different geometric shapes.

Figure 15:
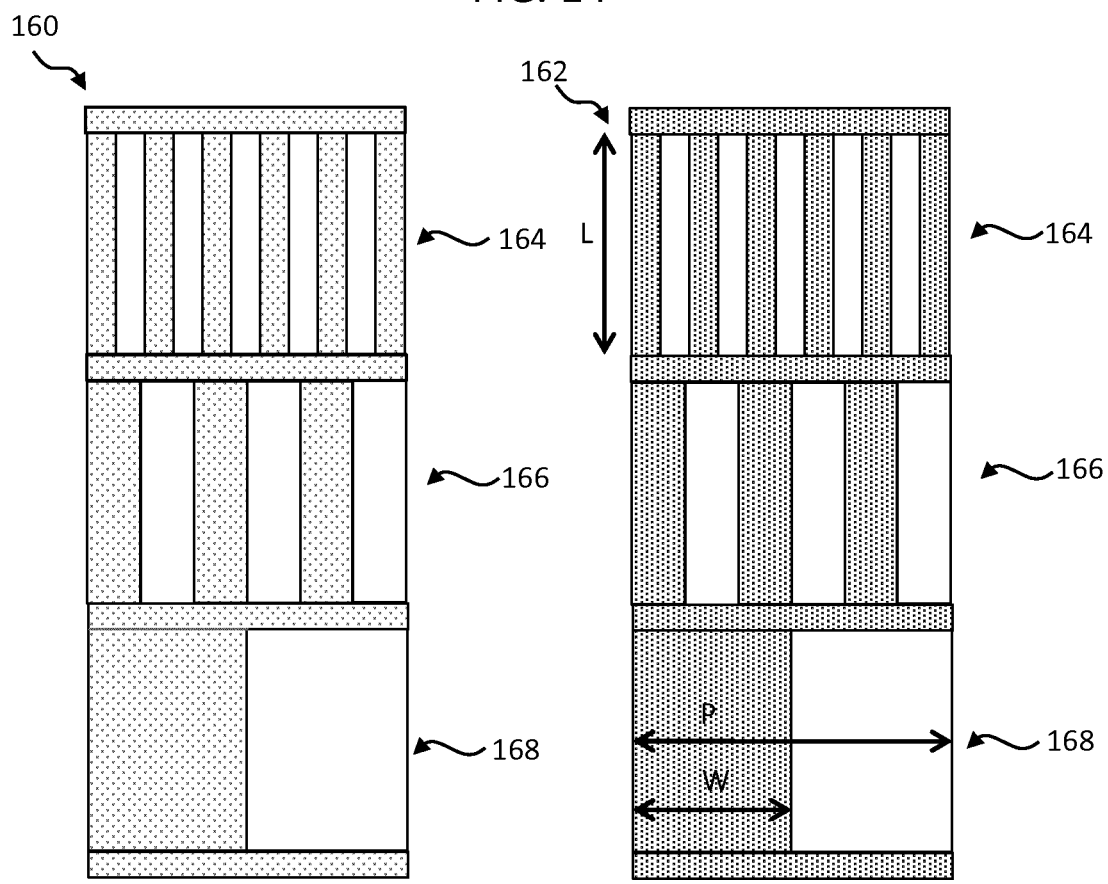
FIG. 15 depicts an example triboelectric electrode pattern in accordance with a seventh example waveform generator device.

FIG. 15 shows a further example of complimentary electrode arrangements 160, 162 which may be provided to the slider and stator respectively (or vice versa) of a TEG in accordance with embodiments of the invention. In this case the slider and stator are each divided into three different generating regions 164, 166, 168, each comprising a differing pattern of electrodes, the patterns each differing both in the width W of each of the component electrodes, and the pitch P between the electrodes. The width W and pitch P is shown only for the bottom region 168. Note that in further examples, the length of the elements L in each of the generating regions may also differ.

Depending upon material choice, surface texture and sliding speed, the output signals created across each of the different regions may differ in voltage amplitude, current amplitude and/or frequency. By optimising the electrode area, material choice and the amount triboelectrically active areas per generating region, a desired combined output waveform may be generated.

The output of each generating region 164, 166, 168 generates an output current of a different frequency, and by combining the multiple currents together, a desired waveform may be produced, having a frequency lower than each of the component frequencies, suitable for example for driving an EAP-based actuator device.

For example, if at a given sliding speed, the various generating regions of a sliding (or rotational) TEG each generate a respective sinusoidal-like output current of a different frequency, it is possible to engineer the particular frequencies so as to produce, through their superposition, a square wave type output. This may be formed through essentially a Fourier series of the plurality of different frequency signals, i.e:

$$I(t)=A\ \mathrm{Sin}(\omega t)+B\ \mathrm{Sin}(3\omega t)+C\ \mathrm{Sin}(5\omega t)+ \tag{1}$$

Such a square type signal could be produced through carefully designing the various generating regions of the stator/rotor so as to generate respective output currents having frequencies which are harmonics of one another. For example, referring to FIG. 15, the pattern of region 168 may be adapted to generate a signal having a fundamental frequency $\omega$, the pattern of region 166 adapted to generate the third harmonic of this frequency, $3\omega$, and the pattern of region 164 adapted to generate the fifth harmonic, $5\omega$.

As is well known, a good approximation to a square wave may be produced by combination of only the first few terms of the Fourier series (1), and hence a stator/rotor comprising just three or four generating regions may be sufficient for producing such an approximate square wave (if correctly designed).

Figure 16:
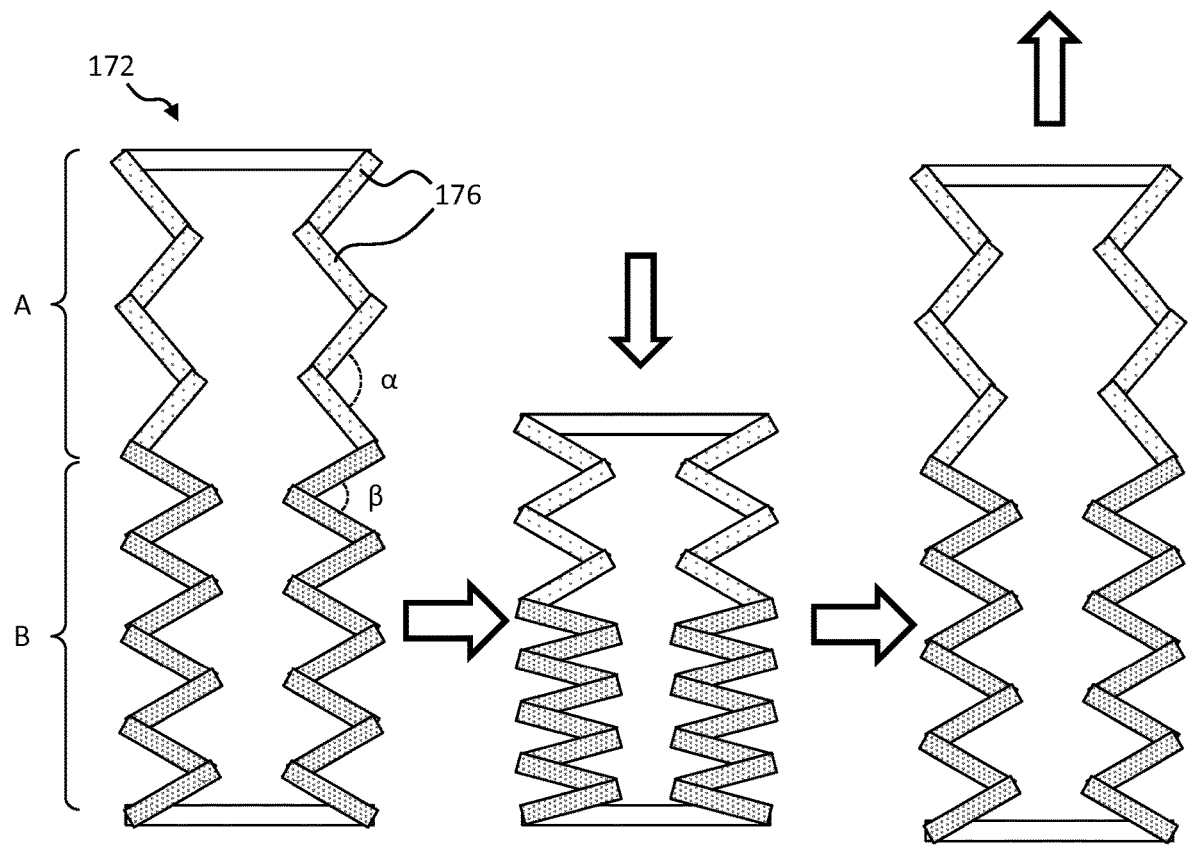
FIG. 16 depicts an eighth example waveform generator device.

FIG. 16 shows a further possible embodiment of the invention, this time comprising a multi-layer tapping-mode TEG 172. The TEG comprises a series of zig-zagging surface elements 172, hinged together to form a concertina-like arrangement, which may be compressed, through application of force. On compression in this way, surfaces of neighbouring hinged elements 176 are brought progressively further into contact with one another. By alternatively compressing and the extending the TEG, the separation distance between neighbouring elements is cyclically varied. If neighbouring surfaces are provided with triboelectric material layers (or triboelectric electrodes) of differing, complementary materials from the triboelectric series, then this action generates a current between the two, through electrostatic induction. The contact induced between the elements as the TEG is compressed also acts to charge the plate elements through the triboelectric effect.

Figure 17:
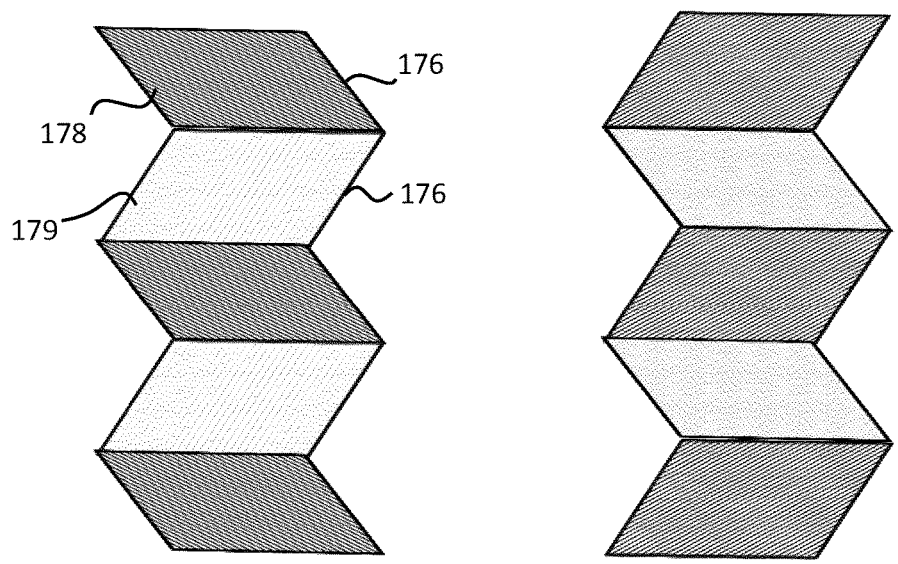
FIG. 17 depicts an isometric view of an illustrative section of the eighth example waveform generator device.

An isometric view of the front and reverse of an example section of one side of the TEG 172 is illustrated in FIG. 17, wherein it can be seen that opposing surfaces 178, 179 of neighbouring generating elements 176 comprise differing complementary triboelectric material layers.

In the embodiment of FIG. 16, the TEG 172 is divided into two different vertically stacked generating regions, A and B. The regions differ in that the maximal angle of extension between neighbouring surface elements is greater for the elements of region A (angle $\alpha$) than for the elements of region B (angle $\beta$). As a result, upon compression of the TEG, the elements of region B begin to contact first, and, for a fixed rate of downward compression, are brought into full contact at a faster rate than those of region B. Hence, over the course of a single compression-extension cycle, the elements of region A generate a more slowly varying output signal than those of regions B (i.e. region A generates an output current having a lower frequency than that of region B).

By combining the signals generated by the differing regions, a resultant output current may be generated by means of the device having a waveform which can be attuned by means of careful engineering of the output frequencies of the each of the contributing regions.

Figure 18:
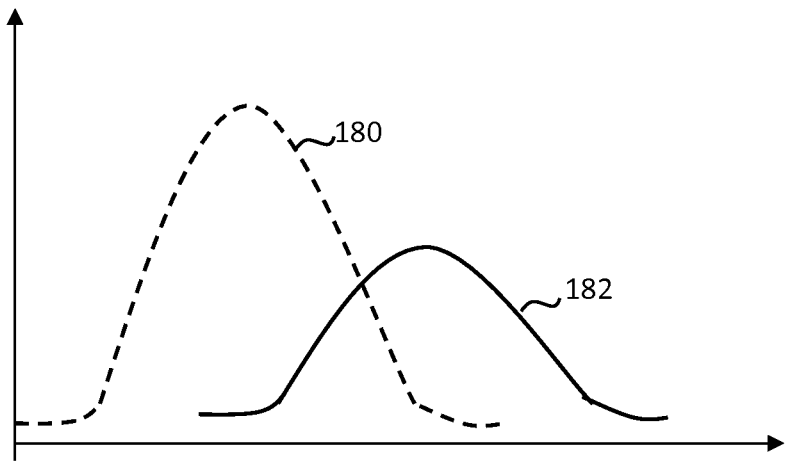
FIG. 18 illustratively depicts example electrical outputs from differing generating regions of the eighth example device.

FIG. 18 schematically illustrates the difference in the output currents generated by the two generating regions over the course of a single compression of the TEG, with waveform 180 representing an example signal generated by region B, and waveform 182 representing the corresponding signal generated by region A.

In alternative embodiments, the angles α, β between neighbouring elements may be the same for both generating regions A and B. However, the stiffness of the hinging between neighbouring elements may be configured to be greater for region A than for region B meaning that, upon compression of the TEG, the elements of region A are brought together more slowly than those of region B. As a result, an output signal from region A is generated having a lower frequency than that of region B.

By changing the contact area (width and length), choice of materials, angle between pairs of elements 176, stiffness between pairs of elements, the total number of elements in each generating region, and the periodicity of the stacked layers, it is possible to attune the different frequencies generated by the various regions. In this way, the overall resultant waveform generated upon combination of the output signals may be attuned.

Note that although the particular example of FIG. 16 comprises a stacked arrangement of just two different generating regions, in alternative examples, arrangements may be provided comprising any number of different generating regions, each adapted to generate output currents of differing frequencies.

Figure 19:
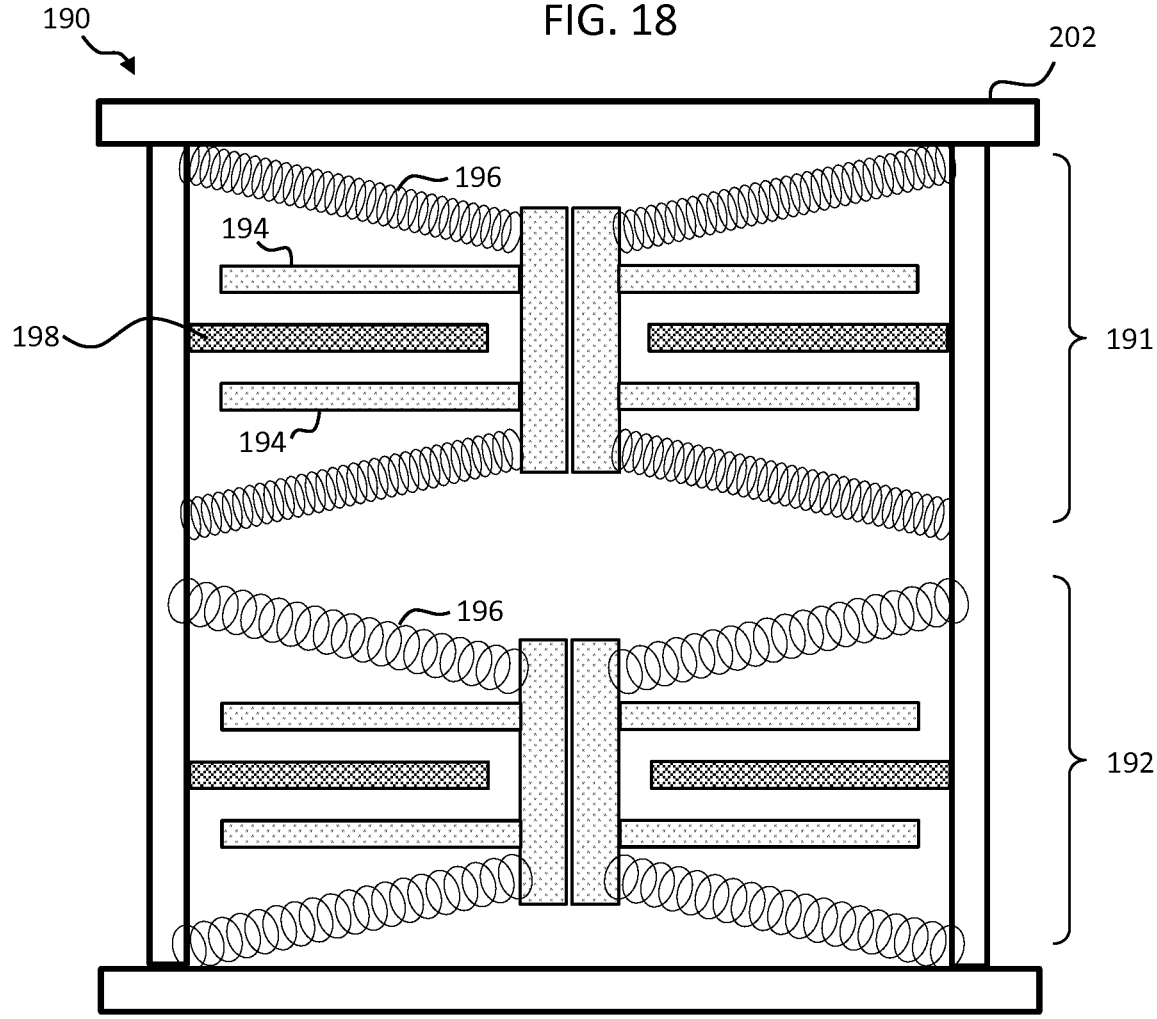
FIG. 19 shows a ninth example waveform generating device.

In FIG. 19 is depicted a further possible embodiment of the invention. Examples of this embodiment are based upon an adaptation of a vibrational harvester type TEG generator, which utilises environmental vibrations to induce relative motion between triboelectric generator plates in order thereby to generate a current.

For the present embodiment, a vibrational-type TEG 190 is provided which comprises a plurality (in this case, two) vibrational generating arrangements 191, 192, wherein for each generating arrangement two pairs of movable generating plates 194 are suspended by springs 196 from a supporting frame 202. For each of the different generating arrangements, springs are provided having differing spring constants. In addition, the masses of the different vibrational elements may also be different. The combination of non-equal spring constants and/or different masses will induce different resonant frequencies when exposed to identical vibrational movements. In this way, the same external driving vibrations will induce in the movable plates of the two respective arrangements physical oscillations of different resonant frequencies. As a result the two arrangements will produce output currents having differing frequencies.

By combining the output currents of the multiple generating arrangements by means of a combining circuit, a resultant output current may be produced having a waveform which can be attuned by means of careful engineering of the spring constants of the springs and/or the masses of the movable elements of each of the different arrangements.

Through suitable combinations of springs and moving masses, multi harmonic signals can be generated from vibrations and superposed resonance frequencies. Whereas in FIGS. 1-18, the repeating pattern of electrodes is used to generate specific waveforms, here the resonance characteristics of a multiple spring-mass (damper) TEG system are the key determinant for the produced waveform signals.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

Any reference signs in the claims should not be construed as limiting the scope.

The invention claimed is:
1. A device for generating electrical current waveforms, comprising:
   an electrical power generator, the electrical generator comprising a plurality of generating arrangements,
     wherein the plurality of generating arrangements comprises a first generating arrangement and a second generating arrangement,
     wherein the first generating arrangement is arranged to generate a first electrical output current, the first electrical output current having a first frequency,
     wherein the second generating arrangement is arranged to generate a second electrical output current, the second electrical output current having a second frequency,
     wherein each arrangement comprises a first set of generating elements and a second set of generating elements,
     wherein for each arrangement, at least the first set of generating elements is configured to hold an electrical charge,
     wherein for each arrangement, the first set of generating elements and the second set of generating elements are configured to be movable with respect to one another; and
   a connecting circuit,
     wherein the connecting circuit provides an electrical connection between the first generating arrangement and the second generating arrangement,
     wherein the connecting circuit is arranged to combine the first electrical output current and the second electrical output current to generate a resultant output current, the resultant output current having a particular waveform and a third frequency,
     wherein the third frequency is different from the first frequency and the second frequency,
   wherein the electrical power generator comprises at least a first plate element and a second plate element,
   wherein the first plate element and the second plate element are arranged to be moveable with respect to one another,
   wherein the first plate element comprises two or more of the first sets of generating elements of the plurality of generator arrangements, and the second plate element comprises two or more of the second sets of generating elements of the plurality of generator arrangements,
   wherein the plate elements are disk elements configured to be rotatable relative to one another,
   wherein the two or more first sets of generating elements of the first plate element form different respective annular arrangements of surface portions of the first plate element and the two or more second sets of generating elements of the second plate element form different respective annular arrangements of surface portions of the second plate element.

2. The device as claimed in claim 1, wherein the first sets of generating elements and the second sets of generating elements form respective first sets of surface portions and the second sets of surface portions of the first plate element and the second plate element.

3. The device as claimed claim 1, wherein the two or more first sets of generating elements of the first plate element form different respective sector surface portions of the first plate element and the two or more second sets of generating elements of the second plate element form different respective sector surface portions of the second plate element.

4. The device as claimed in claim 1, wherein a dimension of each of the generating elements of different generating arrangements, along the direction parallel to the direction of relative motion between the first set of generating elements and the second set of generating elements of the arrangement, is different from any of the other generating elements of the different generating arrangements.

5. The device as claimed in claim 1,
wherein the relative motion between the first set of generating elements and the second set of generating elements of each of the generator arrangements is dependent on a mechanical coupling between the first set and the second set,
wherein the physical properties of the mechanical coupling differs for each of the respective generating arrangements.

6. The device as claimed in claim 5,
wherein the mechanical coupling comprises a spring coupling,
wherein the spring coupling for each generating arrangement has a different spring constant.

7. The device as claimed in claim 5,
wherein the relative motion between the first set of generating elements and the second set of generating elements of each of the generator arrangements is dependent on a hinge coupling,
wherein a maximal angular extension of the hinge coupling differs for each of the respective generating arrangements.

8. The device as claimed in claim 1, wherein the connecting circuit provides a parallel connection between the first electrical output current and the second electrical output current.

9. The device as claimed in claim 1, wherein the connecting circuit comprises a filter circuit.

10. The device as claimed in claim 1, wherein the electrical power generator is a triboelectric power generator.

11. The device as claimed in claim 2, wherein the plate elements are disk elements configured to be rotatable relative to one another.

12. The device as claimed in claim 1, wherein a separation distance between each of component generating elements of different generating arrangements, along the direction parallel to the direction of relative motion between their respective first sets of generating elements and the second sets of generating elements is different from any of the other component generating elements of different generating arrangements.

13. The device as claimed in claim 1, wherein a material composition of the first set of generating elements is different from a material composition of the second set of generating elements.

14. The device as claimed in claim 1,
wherein the first set of generating elements comprises a plurality of first plates,
wherein the second set of generating elements comprises a plurality second plates.

15. The device as claimed in claim 1, wherein a relative motion between the first set of generating elements and the second set of generating elements is arranged to generate the first electrical output current.

\* \* \* \* \*